US012763619B2

(12) United States Patent
Alqarni et al.

(10) Patent No.: US 12,763,619 B2
(45) Date of Patent: Oct. 13, 2026

(54) ELECTRIC MOTOR WITH MIXED MAGNET ROTOR HAVING SIMILAR MAGNET BLOCKS

(71) Applicant: GM Global Technology Operations LLC, Detroit, MI (US)

(72) Inventors: Ali Alqarni, Greenfield, WI (US); Alireza Fatemi, Canton, MI (US); Thomas W. Nehl, Shelby Township, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 197 days.

(21) Appl. No.: 18/931,446

(22) Filed: Oct. 30, 2024

(65) Prior Publication Data

US 2026/0128628 A1 May 7, 2026

(51) Int. Cl.

| | |
|---|---|
| ***H02K 1/276*** | (2022.01) |
| ***H02K 1/02*** | (2006.01) |
| ***H02K 15/035*** | (2025.01) |

(52) U.S. Cl.
CPC ............. *H02K 1/2766* (2013.01); *H02K 1/02* (2013.01); *H02K 15/035* (2025.01)

(58) Field of Classification Search
CPC ....... H02K 1/2766; H02K 1/02; H02K 15/035
See application file for complete search history.

(56) References Cited

U.S. PATENT DOCUMENTS

2007/0284960 A1* 12/2007 Fulton .................... H02K 1/278
310/156.01
2020/0021153 A1* 1/2020 Saito .................... H02K 1/2766

* cited by examiner

*Primary Examiner* — Joseph Ortega
(74) *Attorney, Agent, or Firm* — Vivacqua Crane, PLLC

(57) ABSTRACT

A permanent magnet rotor assembly for an electric motor, an electrified vehicle, and a method is provided. The assembly includes an annular stack of rotor lamination layers ("rotor lams") constructed of a magnetic core material. The rotor lams have inner axial surfaces collectively defining a group of first openings through the magnetic core material and a group of second openings through the magnetic core material. The annular stack includes a first arrangement of permanent magnets and a second arrangement of permanent magnets.

20 Claims, 7 Drawing Sheets

ELECTRIC MOTOR WITH MIXED MAGNET ROTOR HAVING SIMILAR MAGNET BLOCKS

INTRODUCTION

The present disclosure relates to a rotor for an electric motor, and more particularly, to an electric motor with an arrangement of mixed magnets.

A rotary electric machine of the type used in an electric drive system of an electric vehicle operates in a motoring mode in which output torque is delivered to a coupled load (e.g., one or more road wheels of a motor vehicle) and/or a generating mode in which machine rotation is used to generate electricity. In a typical configuration, the electric machine includes a cylindrical rotor formed from an annular stack of thin magnetic rotor lamination layers or "rotor lams." The magnetic material of a rotor lam is typically an alloy of iron and silicon generally referred to in the art as electrical steel.

Permanent magnets may include, for example, neodymium (Nd) magnets, also known as NdFeB, NIB, or Neo magnets. Nd magnets are rare-earth magnets made from an alloy of neodymium (Nd), iron (Fe), and/or boron (B). Nd magnets have high-coercivity (i.e., resistance to being demagnetized) and a high magnetic energy density. Permanent magnets can be disposed within openings or slots in a rotor to generate motor flux having a flux field that follows a predefined path, which can be boosted and/or opposed. Boosting the flux field increases torque production of the electric machine, while opposing the flux field will limit torque production of the electric machine. The configuration and/or topology of the permanent magnets disposed within the rotor can determine the electric machine's power density.

While present rotors for an electric motor achieve their intended purpose, there is a need for new and improved permanent magnet arrangements within rotors that offer improved torque production and power density within the electric motor.

SUMMARY

According to several aspects of the present disclosure, a permanent magnet rotor assembly for an electric motor is provided. The permanent magnet rotor assembly includes an annular stack of rotor lamination layers ("rotor lams") constructed of a magnetic core material. The rotor lams have inner axial surfaces collectively defining a group of first openings through the magnetic core material and a group of second openings through the magnetic core material. The annular stack includes a first arrangement of permanent magnets and a second arrangement of permanent magnets. Each respective permanent magnet of the first arrangement is disposed within a corresponding one of the group of first openings, and the first arrangement of permanent magnets is arranged in a mixed magnet configuration having at least one low-coercivity magnet surrounded by at least two high-coercivity magnets. Each respective permanent magnet of the second arrangement is disposed within a corresponding one of the group of second openings, and the second arrangement of permanent magnets is arranged in a mixed magnet configuration having at least one low-coercivity magnet surrounded by at least two high-coercivity magnets.

In accordance with another aspect of the disclosure, the at least two high-coercivity magnets include at least one of a neodymium-based magnet or a samarium cobalt magnet.

In accordance with another aspect of the disclosure, the at least one low-coercivity magnet includes a ferrite-based magnet.

In accordance with another aspect of the disclosure, the high-coercivity magnets have parallel magnetization.

In accordance with another aspect of the disclosure, the high-coercivity magnets are segmented.

In accordance with another aspect of the disclosure, the at least one low-coercivity magnet is curved and has radial magnetization.

In accordance with another aspect of the disclosure, at least one of the high-coercivity magnets is substantially parallel to a radius of the pole.

In accordance with another aspect of the disclosure, an inner layer of the at least one low-coercivity magnet has a V configuration.

In accordance with another aspect of the disclosure, two low-coercivity magnets are separated by a center post.

In accordance with another aspect of the disclosure, the high-coercivity magnets are a different size than the low-coercivity magnets, and each pole includes only two magnet sizes.

In accordance with another aspect of the disclosure, the first arrangement of permanent magnets includes two low-coercivity magnets, and the second arrangement of permanent magnets includes one low-coercivity magnet.

According to several aspects of the present disclosure, an electrified vehicle is provided. The electrified vehicle includes an electric drive system having an electric motor including a stator and a permanent magnet rotor assembly for the electric motor configured to rotate due to a rotating magnetic field created by the stator. The permanent magnet rotor assembly includes an annular stack of rotor lamination layers ("rotor lams") constructed of a magnetic core material. The rotor lams have inner axial surfaces collectively defining a group of first openings through the magnetic core material and a group of second openings through the magnetic core material, wherein the annular stack includes at least one pole. Each respective permanent magnet of the first arrangement is disposed within a corresponding one of the group of first openings, and the first arrangement of permanent magnets is arranged in a mixed magnet configuration having at least one low-coercivity magnet surrounded by at least two high-coercivity magnets. Each respective permanent magnet of the second arrangement is disposed within a corresponding one of the group of second openings, and the second arrangement of permanent magnets is arranged in a mixed magnet configuration having at least one low-coercivity magnet surrounded by at least two high-coercivity magnets.

In accordance with another aspect of the disclosure, the at least one high-coercivity magnet includes at least one of a neodymium-based magnet or a samarium cobalt magnet.

In accordance with another aspect of the disclosure, the at least one low-coercivity magnet includes a ferrite-base magnet.

In accordance with another aspect of the disclosure, the high-coercivity magnets are segmented.

In accordance with another aspect of the disclosure, the low-coercivity magnets and the high-coercivity magnets are curved and have radial magnetization.

In accordance with another aspect of the disclosure, at least one of the high-coercivity magnets is substantially parallel to a radius of the pole.

In accordance with another aspect of the disclosure, an inner layer of the low-coercivity magnets has a V configuration.

According to several aspects of the present disclosure, a method for manufacturing a permanent magnet rotor assembly is provided. The method includes laminating a plurality of sheets of a magnetic core material to form an annular stack of rotor lams. The sheets have inner axial surfaces collectively defining a group of first openings through the sheets of magnetic core material and a group of second openings through the magnetic core material. The method also includes positioning a first arrangement of permanent magnets within a corresponding one of the group of first openings and positioning a second arrangement of permanent magnets within a corresponding one of the group of second openings. The first arrangement of permanent magnets is arranged in a mixed magnet configuration having at least one low-coercivity magnet surrounded by at least two high-coercivity magnets. The second arrangement of permanent magnets is arranged in a mixed magnet configuration having at least one low-coercivity magnet surrounded by at least two high-coercivity magnets.

In accordance with another aspect of the disclosure, the method further includes positioning a third arrangement of permanent magnets within a corresponding one of a group of third openings. The third arrangement of permanent magnets is arranged in a mixed magnet configuration having at least one low-coercivity magnet surrounded by at least two high-coercivity magnets.

The above features and advantages, and other features and advantages, of the presently disclosed system and method are readily apparent from the detailed description, including the claims, and examples when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
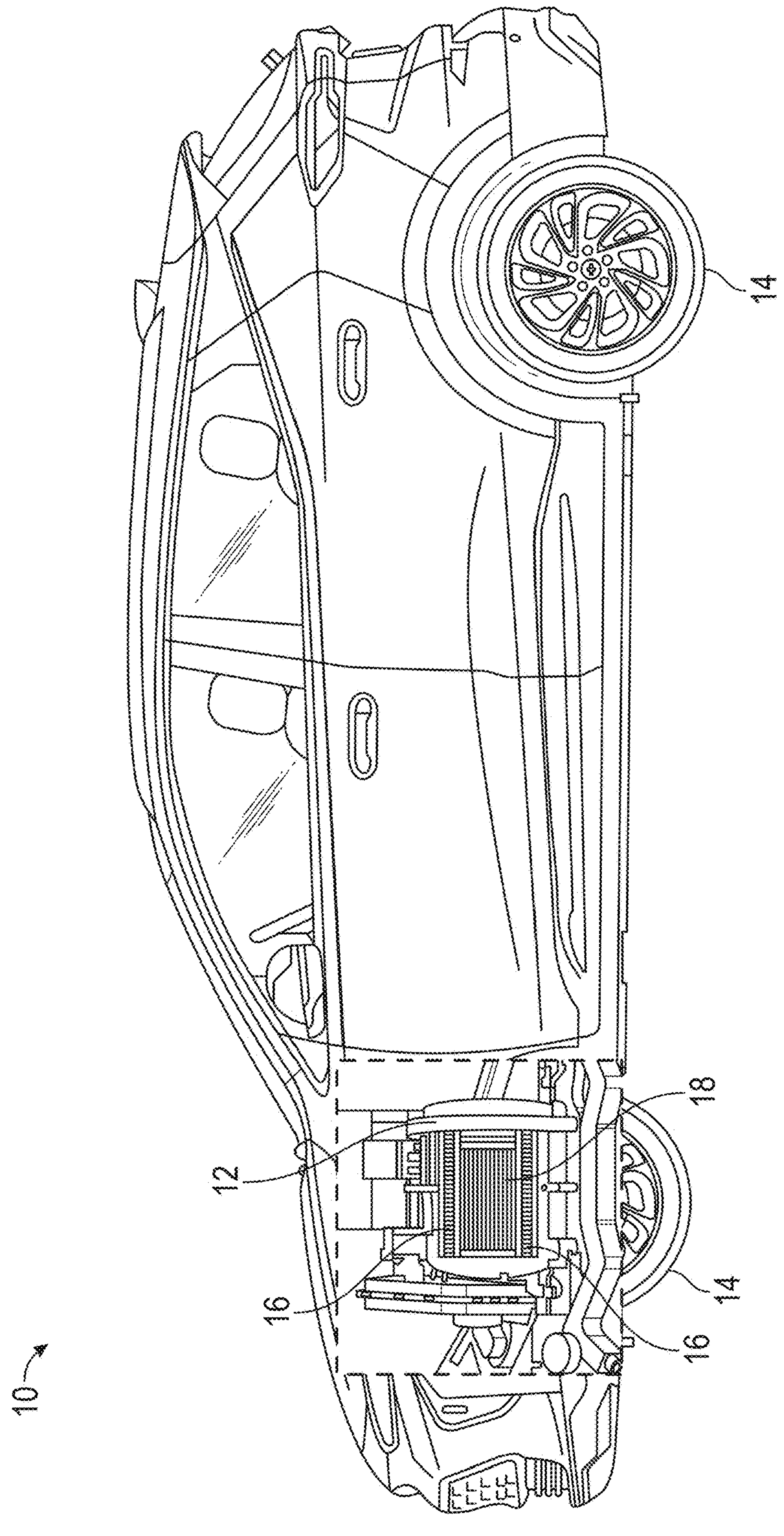
FIG. 1 is a perspective view illustrating an example of a vehicle having an electric motor having a rotor and a stator, in accordance with the present disclosure.

The following description is merely exemplary in nature and is not intended to limit the present disclosure, application, or uses. Furthermore, there is no intention to be bound by any expressed or implied theory presented in the preceding introduction, summary, or the following detailed description. It should be understood that throughout the drawings, corresponding reference numerals indicate like or corresponding parts and features.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. The following description is merely exemplary in nature and is not intended to limit the present disclosure, application, or uses.

A permanent magnet rotor assembly for an electric motor, an electrified vehicle, and a method are disclosed herein. The permanent magnet rotor assembly includes an arrangement of combined permanent magnets including high coercivity and low coercivity magnets. Using the magnet combination described herein reduces reliance on rare-earth materials while using similar permanent magnet blocks to facilitate manufacturing and assembly of the permanent magnet rotor assembly. The permanent magnet rotor assembly described herein uses one building block for each permanent magnet type, which reduces a total number of permanent magnet sizes to two in the case of two arrangements of magnets. In the case of three arrangements of magnets, the magnets may have three or four sizes. Additionally, in terms of torque production, the permanent magnet rotor assembly described herein features mechanisms that help simultaneously with torque maximization of high coercivity content.

FIG. 1 schematically illustrates a motor vehicle 10 having an electric drive system that includes an electric motor 12 in the form of a motor/generator unit and wheels 14 driven by the electric motor 12. The electric motor 12 includes a stator 16 and a permanent magnet rotor assembly 18 that is reinforced and assembled in accordance with the present disclosure. The described permanent magnet rotor assembly 18 may benefit several types of wheeled and/or tracked land vehicles, propeller-driven watercraft and aircraft, mobile work platforms, etc. Non-vehicular systems may likewise benefit from the present disclosure, including for instance electrified powertrain architectures, powerplants, mobile platforms, robots, hoisting or conveying equipment, and the like. The motor vehicle 10 shown in FIG. 1 is illustrative of just one possible beneficial application.

As used herein, the term "vehicle" is not limited to automobiles. While the present technology is described primarily herein in connection with electric and hybrid-electric vehicles, the technology is not limited to electric and hybrid-electric vehicles. The concepts can be used in a wide variety of applications, such as in connection with components used in motorcycles, mopeds, locomotives, aircraft, marine craft, and other vehicles, as well as in other applications utilizing batteries, such as in portable power stations, such as those used for powering remote job sites, emergency back-up power supplies, and permanent power stations associated with buildings and equipment, all of which may be powered by, for example, solar or wind-powered generator systems, power mains, and fuel based power generators such as gasoline, propane, kerosene, or diesel generators as well as sterling engines.

The electric motor 12 illustrated in FIG. 1 includes the stator 16 and the permanent magnet rotor assembly 18. As appreciated in the art, the stator 16 may include slots that are wound or filled with conductive stator windings (not shown), such that when energized, interaction between the stator 16 and the permanent magnet rotor assembly 18 causes rotation of the permanent magnet rotor assembly 18. The permanent magnet rotor assembly 18 is coupled via an output member (not shown) to one or more road wheels 14 disposed on a drive axle (not shown).

The electric motor 12 is depicted schematically in FIG. 1 with the stator 16 coaxially arranged with respect to the permanent magnet rotor assembly 18 in a typical radial flux configuration. The present disclosure is also extendable to axial flux configurations. The electric motor 12 may be configured as a polyphase/alternating current (AC) traction or propulsion motor in some examples.

Figure 2:
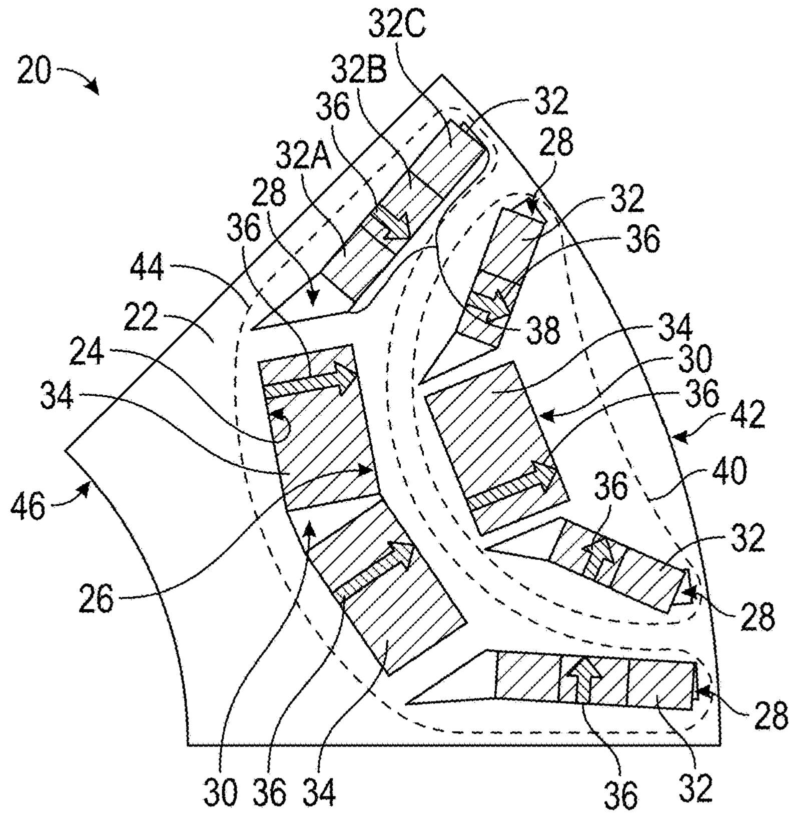
FIG. 2 is a plan view illustrating a pole section of the rotor in the electric motor shown in FIG. 1, where the rotor has an eight pole section configuration, and the pole section includes two layers, in accordance with the present disclosure.

Referring now to FIG. 2, a schematic plan view illustration is provided of a representative magnetic pole section 20 of the rotor assembly 18 shown in FIG. 1, with the magnetic pole section 20 including an annular stack of rotor lamination layers (or "rotor lams") 22, one of which is visible from the perspective of FIG. 2. The rotor lams 22, which are constructed of a magnetic core material, for example, but not limited to silicon steel (FeSi) and/or cobalt steel (FeCo), have inner axial surfaces 24, 26 collectively defining a first plurality of openings 28 through the magnetic core material of the rotor lams 22 and a second plurality of openings 30 through the magnetic core material of the rotor lams 22.

A first plurality of permanent magnets 32 is disposed within the first plurality of openings 28 through the magnetic core material of the rotor lams 22. Each respective one of the first plurality of permanent magnets 32 is disposed within a corresponding one of the first plurality of openings 28 through the magnetic core material of the rotor lams 22. The first plurality of permanent magnets 32 includes high coercivity magnets, for example but not limited to rare-earth magnets (e.g., neodymium-based (Nd) magnets and/or samarium (Sm) magnets). In a specific example, the first plurality of permanent magnets 32 includes neodymium-iron-boron (NdFeB) magnets that include dysprosium (Dy), which have a high magnetic strength. Adding dysprosium to NdFeB magnets enhances performance at high temperatures by increasing coercivity, or a resistance to demagnetization. In an additional example, the high coercivity magnets may have a square or rectangular configuration and, in some instances, may be segmented, but not in an axial direction as in conventional topologies. Multiple magnet segments may be combined to form a block.

A second plurality of permanent magnets 34 are disposed within the second plurality of openings 30 through the magnetic core material of the rotor lams 22, with each respective one of the second plurality of permanent magnets 34 being disposed within a corresponding one of the second plurality of openings 30 through the magnetic core material of the rotor lams 22. The second plurality of permanent magnets 34 includes low-coercivity magnets, for example but not limited to magnets that include less than about 10% by weight of rare-earth elements and/or less than about 1% by weight of heavy rare-earth elements (e.g., FeN, ferrite, Alinco and/or ceramic magnets). Ferrite magnets, also known as ceramic magnets, are permanent magnets formed from a composite of iron oxide ($Fe_2O_3$) and other metal elements, for example barium or strontium. Ferrite magnets are inexpensive compared to other types of magnets, are resistant to corrosion, and have a high resistance to demagnetization. While the second plurality of permanent magnets 34 includes magnets that include less than about 10% by weight of rare-earth elements and/or less than about 1% by weight of heavy rare-earth elements, it should be appreciated that some of the magnets in the second plurality of permanent magnets 34 may include more than about 10% by weight of rare-earth elements and/or more than about 1% heavy rare-earth elements. The term "about" will be understood by those of skill in the art. Alternatively, the term "about" will be understood to mean plus or minus 1%.

In some instances, the first plurality of permanent magnets 32 and/or the second plurality of permanent magnets 34 may have parallel magnetization. For example, each of the permanent magnets have a magnetic dipole aligned in a configuration that is parallel to an external magnetic field, as illustrated by arrows 36 in FIG. 2. Because the magnets are permanent magnets, the magnetic dipoles remain aligned even after an external magnetic field is removed. FIG. 2 illustrates a flux guidance mechanism that allows for identical neodymium blocks in addition to higher electromagnetic frequency (EMF) and torque.

Additionally, each of the permanent magnets 32, 34 may be individually segmented magnets or magnets with a one-piece configuration that can be combined to form a block 38. For example, as illustrated in FIG. 2, a first permanent magnet 32A, a second permanent magnet 32B, and a third permanent magnet 32C are combined to form the block 38. While the blocks 38 illustrated in FIG. 2 are formed by permanent magnets from the first plurality of permanent magnets 32, it will be appreciated that the second plurality of permanent magnets 34 may also be combined to form a block. Each permanent magnet 32A, 32B, 32C of the block 38 may be bonded together using a bonding agent such as epoxy or phenolic adhesive, for example. For instance, the epoxy or phenolic adhesive may include polyurethane, benzoxazine, bismaleimide, methacrylate, and the like. It will be appreciated that the bonding agent may include other suitable bonding agents.

Additionally, the first plurality of permanent magnets 32 and the second plurality of permanent magnets 34 shown in FIG. 2 have a rectangular configuration; however, it will be appreciated that each or any of the permanent magnets 32, 34 may have other configurations as will be shown below.

FIG. 2 illustrates a two-layer pole section 20 of the rotor assembly 18 shown in FIG. 1. In this example, a first layer 40 includes a portion of the first plurality of permanent magnets 32 (shown as segmented blocks) and a portion of the second plurality of permanent magnets 34 (shown with one ferrite magnet) arranged proximate an outer radial edge 42 of the pole section 20. A second layer 44 includes another portion of the first plurality of permanent magnets 32 (shown as segmented blocks) and another portion of the second plurality of permanent magnets 34 (shown with two ferrite blocks) arranged more proximate to an inner radial edge 46 of the pole section 20 than the first layer 40. Using a mixture of the first plurality of permanent magnets 32 and the second plurality of permanent magnets 34 facilitates efficient manufacturing while enabling a reduction of the first plurality of permanent magnets 32 (e.g., Nd-based magnets) and still maintaining a same or similar torque production. Additionally, the two-layer pole section 20 provides for a reduction of Nd-based magnets in an axial direction and a reduction in eddy current losses.

Figure 3:
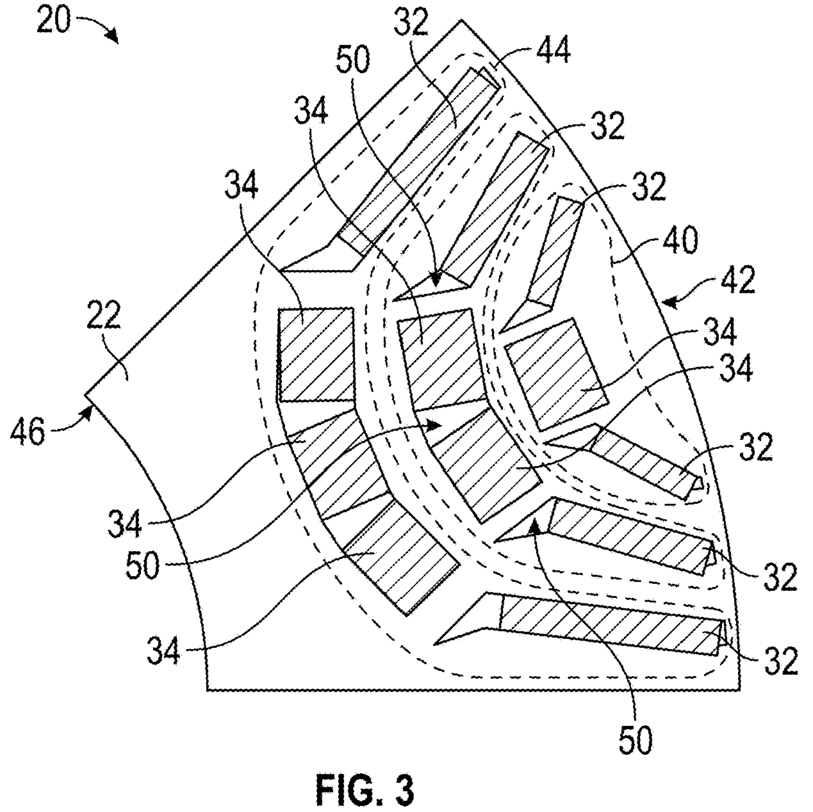
FIG. 3 is a plan view illustrating a pole section of the rotor in the electric motor shown in FIG. 1, where the pole section includes three layers, in accordance with the present disclosure.

FIG. 3 illustrates a three-layer pole section 20 of the rotor assembly shown in FIG. 1 including a first layer 40, a second layer 44, and a third layer 48. The first layer 40 has a first portion of the first plurality of permanent magnets 32 and a first portion of the second plurality of permanent magnets 34 (shown as one ferrite magnet) arranged proximate an outer radial edge 42 of the pole section 20. The second layer 44 includes a second portion of the first plurality of permanent magnets 32 and a second portion of the second plurality of permanent magnets 34 (shown with two ferrite magnets) arranged proximate to an inner radial edge 46 of the pole section 20. The third layer 48 includes a third portion of the first plurality of permanent magnets 32 and a third portion of the second plurality of permanent magnets 34 (shown with three ferrite magnets), and the third layer 48 is disposed between the first layer 40 and the second layer 44. Additionally, the third layer 48 is disposed in a third plurality of openings 50 through the magnetic core material of the rotor lams 22. The three-layer pole section 20 facilitates ease of manufacturing and reduces a number of Nd-based magnets for a same or similar torque production.

Figure 4:
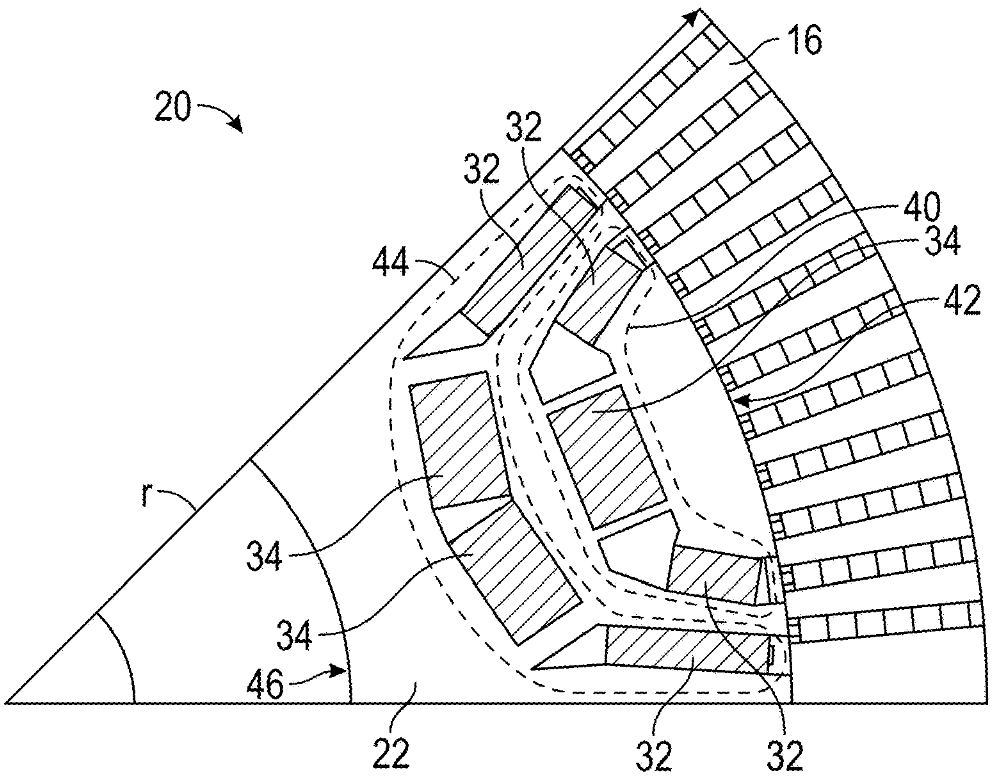
FIG. 4 is a plan view illustrating a pole section of the rotor in the electric motor shown in FIG. 1, where at least one of the neodymium-based magnets is substantially parallel with a radius of the pole section, in accordance with the present disclosure.

FIG. 4 illustrates a two-layer pole section 20 that includes substantial parallelism between the first layer 40 and the second layer 44. In this example, a first layer 40 includes a portion of the first plurality of permanent magnets 32 and a portion of the second plurality of permanent magnets 34 (shown with one ferrite magnet) arranged proximate to an outer radial edge 42 of the pole section 20. A second layer 44 includes another portion of the first plurality of permanent magnets 32 and another portion of the second plurality of permanent magnets 34 (shown with two ferrite blocks) arranged more proximate to an inner radial edge 46 of the pole section 20 than the first layer 40. In the second layer 44, the portion of the first plurality of permanent magnets 32 substantially extend parallel to a radius r of the pole section 20. The term "substantially" is understood by those in the art. Alternatively, the term "substantially" is defined as being aligned within 10° of the radius r. This configuration with the flux guidance mechanism provides for torque maximization and efficient utilization of the Nd-based magnets in the first plurality of Nd-based magnets.

Figure 5:
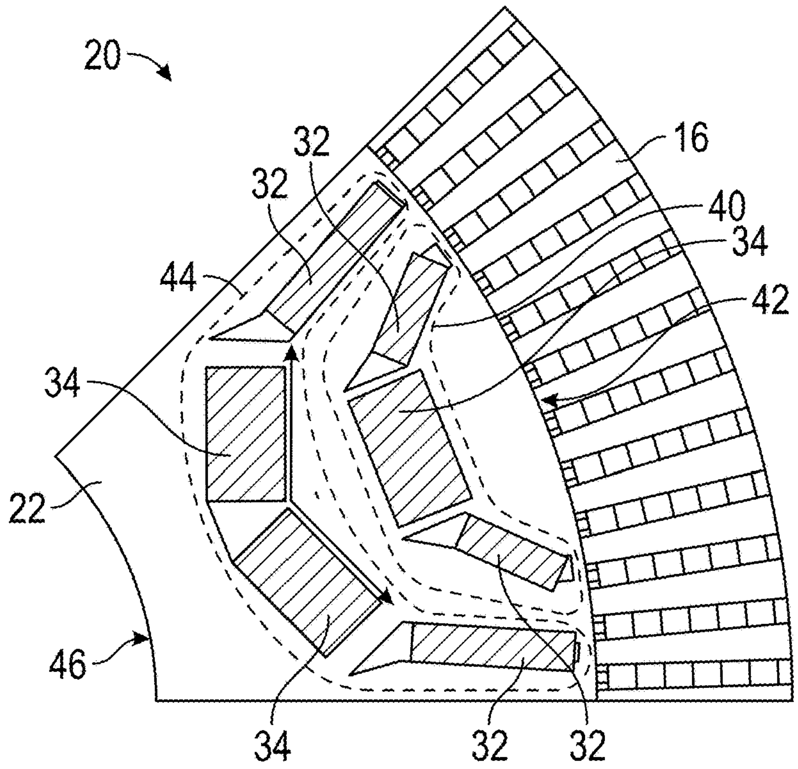
FIG. 5 is a plan view illustrating a pole section of the rotor in the electric motor shown in FIG. 1, where at least two of the ferrite permanent magnets is in a V-shaped configuration, in accordance with the present disclosure.

FIG. 5 illustrates a two-layer pole section 20 that includes a V-shaped ferrite magnet configuration. In this example, a first layer 40 includes a portion of the first plurality of permanent magnets 32 and a portion of the second plurality of permanent magnets 34 (shown with one ferrite magnet) arranged proximate an outer radial edge 42 of the pole section 20. A second layer 44 includes another portion of the first plurality of permanent magnets 32 and another portion of the second plurality of permanent magnets 34 (shown with two ferrite blocks, where the two ferrite magnets are arranged at an angle a to each other in a "V" configuration) arranged more proximate to an inner radial edge 46 of the pole section 20 than the first layer 40. In the second layer 44, the two ferrite blocks may be at a variety of angles determined to maximize torque while minimizing resistance against demagnetization.

Figure 6:
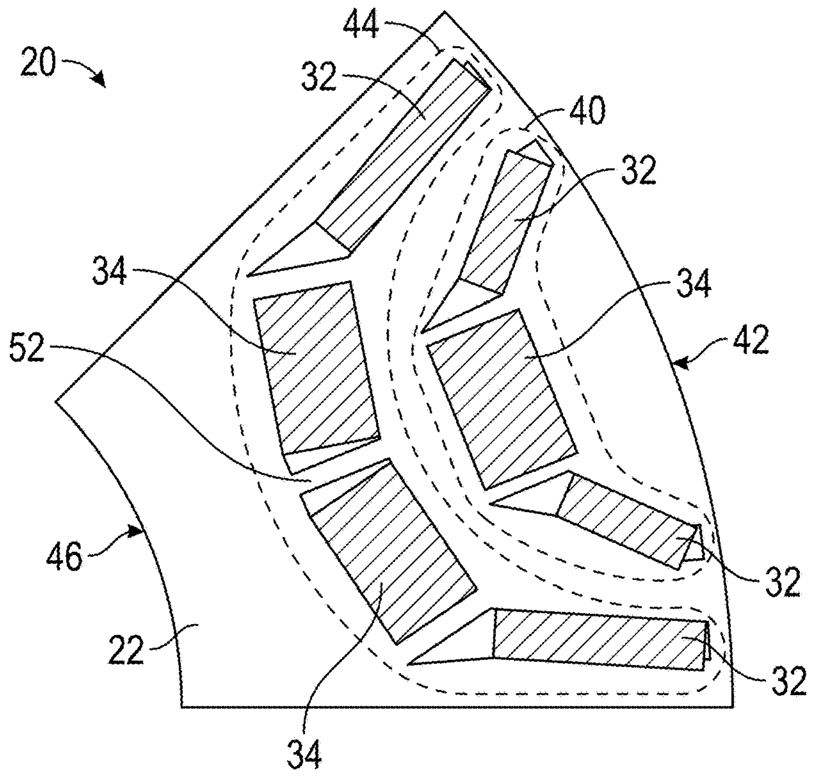
FIG. 6 is a plan view illustrating a pole section of the rotor in the electric motor shown in FIG. 1, where the pole section includes webs and a center post for high speed operation, in accordance with the present disclosure.

FIG. 6 illustrates a two-layer pole section 20 that includes configuration for webs for high-speed operation. In this example, a first layer 40 includes a portion of the first plurality of permanent magnets 32 and a portion of the second plurality of permanent magnets 34 (shown with one ferrite magnet) arranged proximate an outer radial edge 42 of the pole section 20. A second layer 44 includes another portion of the first plurality of permanent magnets 32 and another portion of the second plurality of permanent magnets 34 (shown with two ferrite blocks) arranged proximate to an inner radial edge 46 of the pole section 20. Within the second layer 44, the two ferrite blocks are separated by a center post 52. In this instance, the center post 52 is a portion of the rotor lams 22 extending between each of the second plurality of permanent magnets 34 (e.g., the two ferrite magnets). Including a center post 52 enables a higher speed operation with side webs without limiting the Nd-based magnets to grow radially inward.

Figure 7:
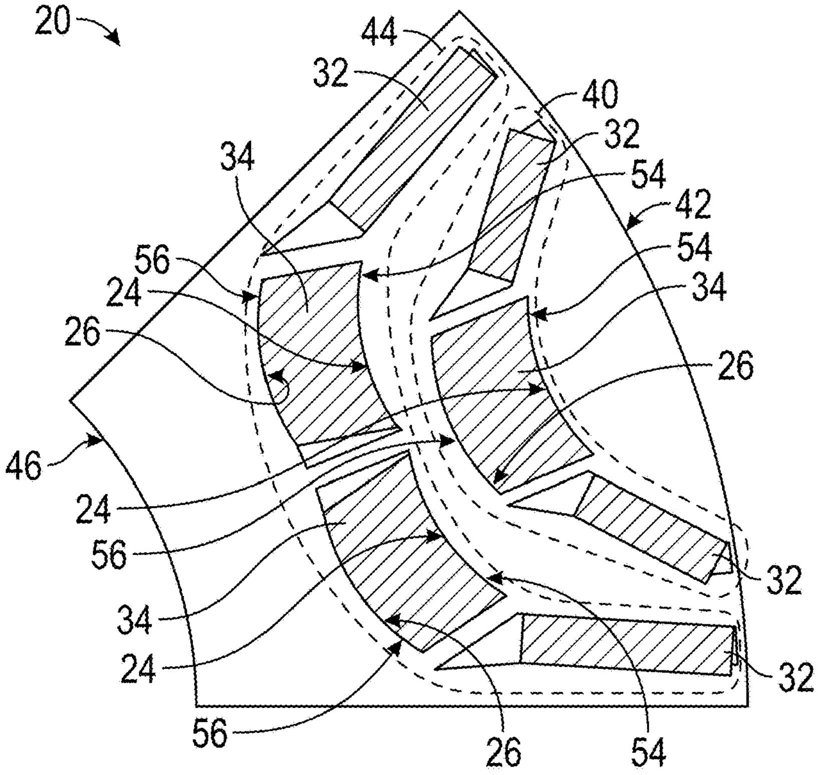
FIG. 7 is a plan view illustrating a pole section of the rotor in the electric motor shown in FIG. 1, where the ferrite permanent magnets have a curved configuration, in accordance with the present disclosure.

FIG. 7 illustrates a two-layer pole section 20 that includes a second plurality of permanent magnets 34 that have a curved configuration. In this example, a first layer 40 includes a portion of the first plurality of permanent magnets 32 and a portion of the second plurality of permanent magnets 34 (shown with one ferrite magnet) arranged proximate an outer radial edge 42 of the pole section 20. A second layer 44 includes another portion of the first plurality of permanent magnets 32 and another portion of the second plurality of permanent magnets 34 (shown with two ferrite blocks) arranged proximate to an inner radial edge 46 of the pole section 20. As illustrated in FIG. 7, each of the second plurality of permanent magnets 34 includes a first curved surface 54 and a second curved surface 56. Additionally, inner axial surfaces 24, 26 of each of the second plurality of openings 30 have curved profiles that correspond respectively to the first curved surface 54 and the second curved surface 56 of the second plurality of permanent magnets 34. Implementing curved magnets, in this case a curved second plurality of permanent magnets 34, simplifies manufacturing since curved ferrite magnets can be easier to manufacture.

Figure 8:
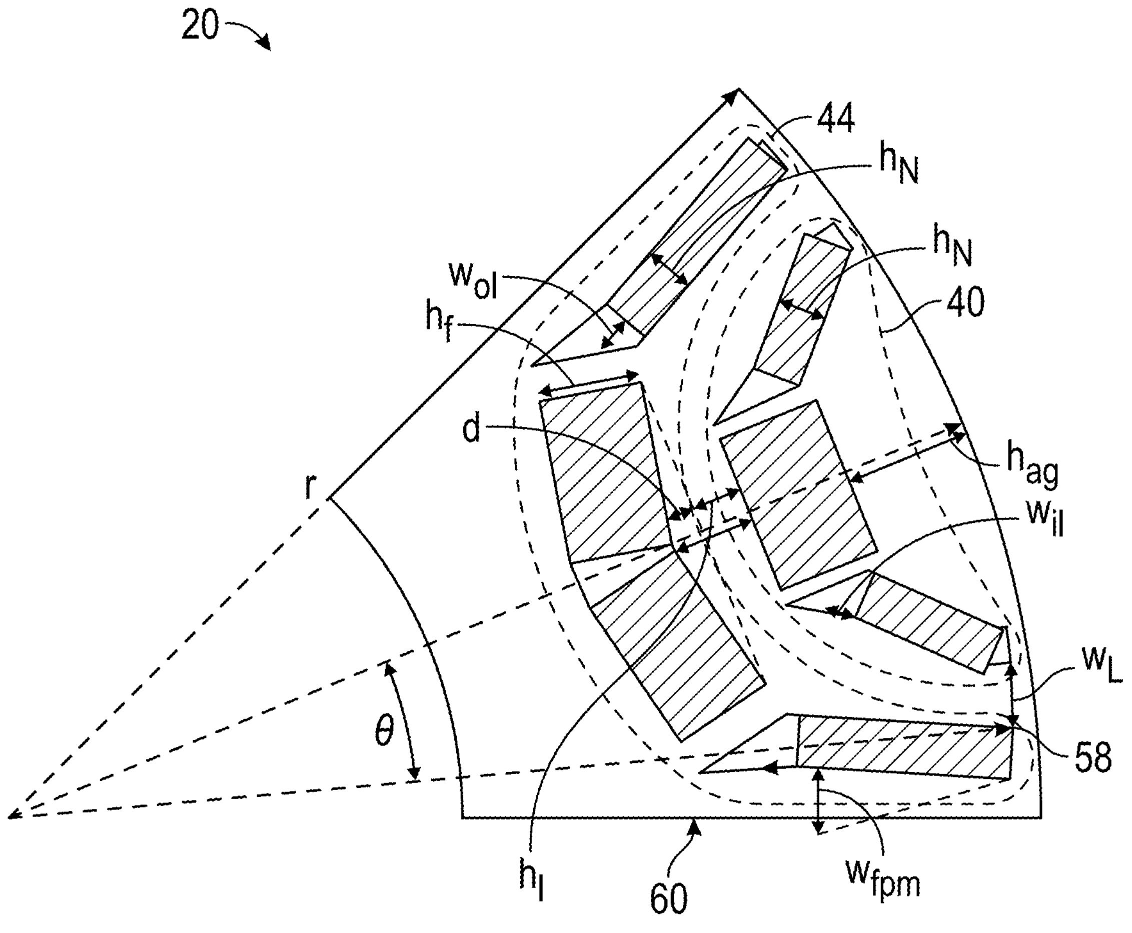
FIG. 8 is a plan view illustrating a pole section of the rotor in the electric motor shown in FIG. 1, where the rotor includes eight pole sections, and the pole section has two layers of permanent magnets, in accordance with the present disclosure.

FIG. 8 illustrates a two-layer pole section 20 included in the rotor assembly 18 depicted in FIG. 1 having an eight pole configuration that includes a non-limiting example of specific optimum ranges, where the ranges are given in angles or distance and are normalized to an outer radius r of the rotor assembly 18. The pole section 20 includes a first layer 40 and a second layer 44. For example, a half pole span angle θ between an inner vertex 58 of one of the first plurality of permanent magnets 32 and radius r extending through a middle of the pole section 20 may be between 16.8°-17.85° or between 45-65% of a half pole span. A height $h_f$ of one of the second plurality of permanent magnets 34 (e.g., a ferrite magnet) may be between 7.5-9 millimeters (mm) or between 10-14% of the outer radius r. A height $h_l$ between the first layer 40 and the second layer 44 (e.g., shown between ferrite blocks) may be 0.85-3 mm or between 0.5-4.5% of the outer radius r. A depth d of a V-shape between multiple ones of the second plurality of permanent magnets 34 may be between 3 mm or between 3-4% of the outer radius r. A height $h_{ag}$ between the first layer 40 and the outer radial edge 42 may be 5.4-7.5 mm or between 5-11% of the outer radius r. A height $h_N$ of one of the first plurality of permanent magnets 32 may be between 3.7-4 mm or between 4-7% of the outer radius r. A width $w_{ol}$ of an outer layer of one of the first plurality of permanent magnets 32 may be between 0-0.35 mm or between 0-5% of the outer radius r. A width $w_{in}$ of an inner layer of one of the first plurality of permanent magnets 32 may be between 0-0.5 mm or between 0-5% of the outer radius r. A width $w_{fpm}$ between a side edge 60 of the pole section and one of the first plurality of permanent magnets 32 in the second layer 44 may be between 7-11.4 mm or between 8.5-15.6% of the outer radius r. A width $w_L$ between the first layer 40 and the second layer 44 may be between 1.5-3.4 mm or between 3-10% of the pole span. These values are exemplary and it will be appreciated that other values, angles, and/or dimensions may be utilized.

Figure 9:
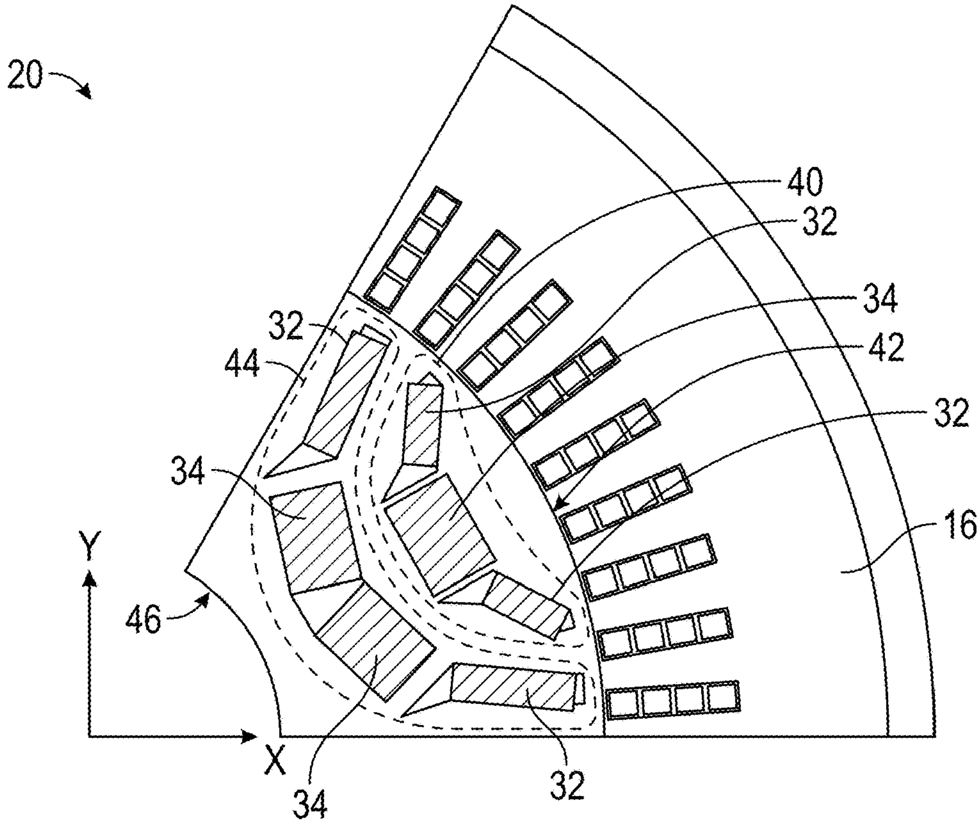
FIG. 9 is a plan view illustrating a pole section of the rotor in the electric motor shown in FIG. 1, where the rotor has a six pole section configuration, and the pole section includes two layers, in accordance with the present disclosure.

FIG. 9 illustrates a two-layer pole section 20 of the rotor assembly 18 shown in FIG. 1. In this example, the rotor assembly 18 includes a six pole section configuration and is disposed proximate the stator 16 depicted in FIG. 1. In this example, a first layer 40 includes a portion of the first plurality of permanent magnets 32 (shown as segmented blocks) and a portion of the second plurality of permanent magnets 34 (shown with one ferrite magnet) arranged proximate an outer radial edge 42 of the pole section 20. A second layer 44 includes another portion of the first plurality of permanent magnets 32 (shown as segmented blocks) and another portion of the second plurality of permanent magnets 34 (shown with two ferrite blocks) arranged more proximate to an inner radial edge 46 of the pole section 20 than the first layer 40. Using a mixture of the first plurality of permanent magnets 32 and the second plurality of permanent magnets 34 facilitates efficient manufacturing while enabling a reduction of the first plurality of permanent magnets 32 (e.g., Nd-based magnets) and still maintaining a same or similar torque production. Additionally, the two-layer pole section 20 provides for a reduction of Nd-based magnets an axial direction and a reduction in eddy current losses.

Figure 10:
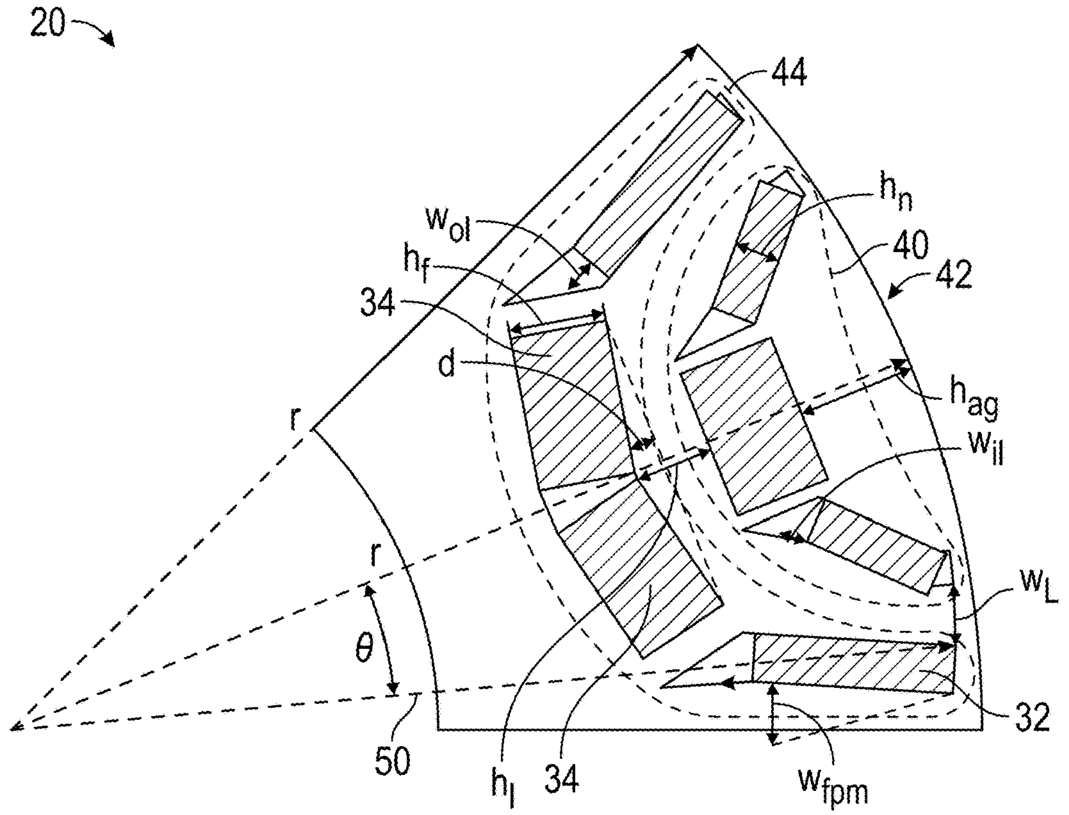
FIG. 10 is a plan view illustrating a pole section of the rotor in the electric motor shown in FIG. 1, where the rotor includes six pole sections, and the pole section has two layers of permanent magnets, in accordance with the present disclosure.

FIG. 10 illustrates a two-layer pole section 20 included in the rotor assembly 18 depicted in FIG. 1 having an eight pole parametric configuration that includes a non-limiting example of specific optimum ranges, where the ranges are given in angles or distance and are normalized to an outer radius r of the rotor assembly 18 and/or the two-layer pole section 20. The two-layer pole section 20 includes a first layer 40 and a second layer 44. For example, a half pole span angle θ between an inner vertex 58 of one of the first plurality of permanent magnets 32 and radius r extending through a middle of the pole section 20 may be between 16.45°-19.5° or between 45-65% of a half pole span. A height $h_f$ of one of the second plurality of permanent magnets 34 (e.g., a ferrite magnet) may be between 6-8 millimeters (mm) or between 10-14% of the outer radius r. A height $h_l$ between the first layer 40 and the second layer 44 (e.g., shown between ferrite blocks) may be between 0-2.5 mm or between 0.5-4.5% of the outer radius r. A depth d of a V-shape between multiple ones of the second plurality of permanent magnets 34 may be between 2-4 mm or between 0-7% of the outer radius r. A height $h_{ag}$ between the first layer 40 and the outer radial edge 42 may be 3-6 mm or between 5-11% of the outer radius r. A height $h_N$ of one of the first plurality of permanent magnets 32 may be between 2.7-3.4 mm or between 4-7% of the outer radius r. A width $w_{ol}$ of an outer layer of one of the first plurality of permanent magnets 32 may be between 0-0.35 mm or between 0-5% of the outer radius r. A width $w_{il}$ of an inner layer of one of the first plurality of permanent magnets 32 may be between 0-0.3 mm or between 0-5% of the outer radius r. A width $w_{fpm}$ between a side edge 60 of the pole section and one of the first plurality of permanent magnets 32 in the second layer 44 may be between 5-9 mm or between 8.5-15.6% of the outer radius r. A width $w_L$ between the first layer 40 and the second layer 44 may be between 1-3.4 mm or between 3-10% of the pole span. These values are exemplary and it will be appreciated that other values, angles, and/or dimensions may be utilized.

Figure 11:
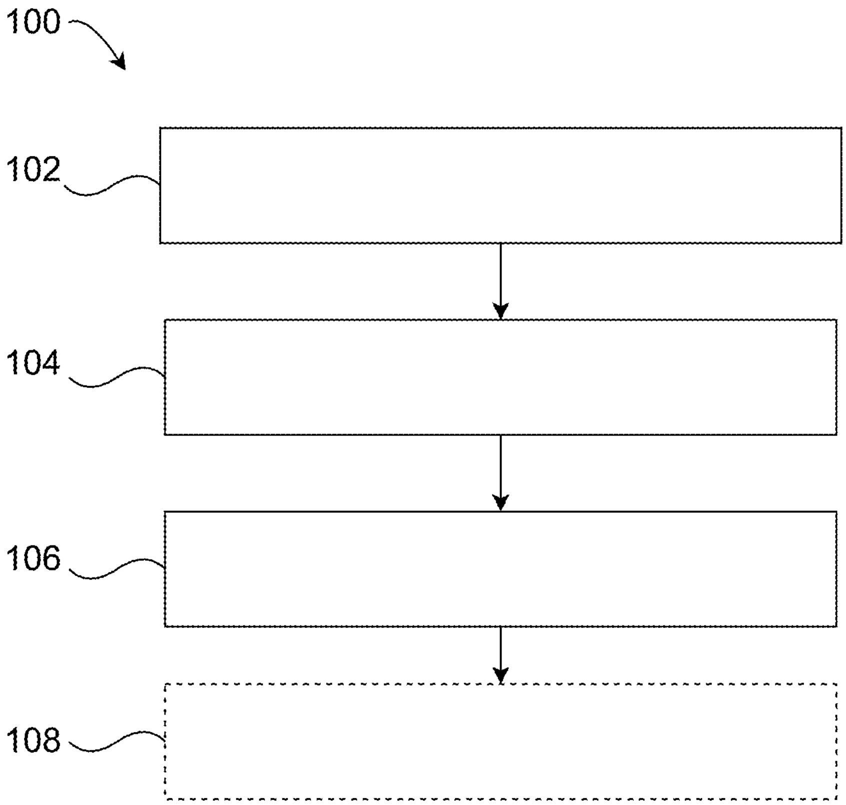
FIG. 11 is a flowchart illustrating a method manufacturing a permanent magnet rotor assembly as shown in FIG. 1, in accordance with the present disclosure.

With reference to FIG. 11, a method 100 for manufacturing a permanent magnet rotor assembly 18 is presented, in accordance with the present disclosure. The method starts at block 102.

Block 102 depicts laminating a plurality of sheets of a magnetic core material to form an annular stack and rotor lams 22. Laminating the plurality of sheets of the magnetic core material (e.g., steel) may include selecting the material, such as silicon steel because of its excellent magnetic properties and low core losses. Silicon content of the silicon steel may vary and may include grades such as M19, M27, and/or M36, for example. The steel sheets may be punched or stamped into specific shapes and sizes suitable for use in the rotor. Laminating the plurality of sheets of the magnetic core material may also include coating the sheets with an insulating material, such as varnish or lacquer, using a sprayer or some other suitable device. Laminating the sheets serves to reduce eddy current losses by electrically isolating each lamination. The sheets (or "rotor lams 22") have inner axial surfaces 24, 26 collectively defining a group of first openings 28 through the sheets of magnetic core material and a group of second openings 30 through the magnetic core material.

Block 104 depicts positioning a first arrangement of permanent magnets within a corresponding one of the group of first openings. Positioning the first arrangement of permanent magnets (or "first layer 40") can include using a robot, for example, to place the first arrangement of permanent magnets within the first openings 28. The first arrangement of permanent magnets is in a mixed magnet configuration because the first arrangement includes at least one of the first plurality of permanent magnets 32 and at least one of the second plurality of permanent magnets 34. The mixed magnet configuration may include at least one low-coercivity magnet surrounded by at least two high-coercivity magnets.

Block 106 depicts positioning a second arrangement of permanent magnets within a corresponding one of the group of second openings. Positioning the second arrangement of permanent magnets (or "second layer 44") can include using a robot, for example, to place the second arrangement (e.g., second layer 44) of permanent magnets within the second openings 30. The second arrangement of permanent magnets is in a mixed magnet configuration because the second arrangement includes at least one of the first plurality of permanent magnets 32 and at least one of the second plurality of permanent magnets 34. The mixed magnet configuration may include at least one low-coercivity magnet surrounded by at least two high-coercivity magnets.

Optional block 108 depicts positioning a third arrangement of permanent magnets within a corresponding one of a group of third openings. In some instances, a third arrangement of permanent magnets (e.g., a third layer 48) may be implemented. Positioning the third arrangement of permanent magnets (or "third layer 48") can include using a robot, for example, to place the third arrangement (e.g., second layer 44) of permanent magnets within a group of third openings. The third arrangement of permanent magnets is in a mixed magnet configuration because the third arrangement includes at least one of the first plurality of permanent magnets 32 and at least one of the second plurality of permanent magnets 34. Similar to above, the mixed magnet configuration may include at least one low-coercivity magnet surrounded by at least two high-coercivity magnets.

The permanent magnet rotor assembly 18 for the electric motor 12 of the present disclosure is advantageous and beneficial over prior art. The permanent magnet rotor assembly 18 facilitates efficient manufacturing and assembly because it includes similar magnets. Additionally, the permanent magnet rotor assembly 18 maximizes torque and efficient utilization of Nd-based magnets with flux guidance and a V-shaped ferrite magnet configuration. The permanent magnet rotor assembly 18 provides for a reduction of Nd-based magnet cost while obtaining a same or similar torque production when using two-magnet layers, a reduction in eddy current losses for the Nd-based magnets, and a reduction of axial segments. Moreover, the permanent magnet rotor assembly 18 provides higher speed operation when using side webs and a center post 52.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A permanent magnet rotor assembly for an electric motor, comprising:

an annular stack of rotor lamination layers ("rotor lams") constructed of a magnetic core material, the rotor lams having inner axial surfaces collectively defining a group of first openings through the magnetic core material and a group of second openings through the magnetic core material, wherein the annular stack includes at least one pole that includes a first arrangement of permanent magnets, wherein each respective permanent magnet of the first arrangement is disposed within a corresponding one of the group of first openings, and wherein the first arrangement of permanent magnets is arranged in a mixed magnet configuration having at least one low-coercivity magnet surrounded by at least two high-coercivity magnets; and a second arrangement of permanent magnets, wherein each respective permanent magnet of the second arrangement is disposed within a corresponding one of the group of second openings, wherein the second arrangement of permanent magnets is arranged in a mixed magnet configuration having at least one low-coercivity magnet surrounded by at least two high-coercivity magnets.

2. The permanent magnet rotor assembly of claim 1, wherein the at least two high-coercivity magnets include at least one of a neodymium-based magnet or a samarium cobalt magnet.

3. The permanent magnet rotor assembly of claim 1, wherein the at least one low-coercivity magnet includes a ferrite-based magnet.

4. The permanent magnet rotor assembly of claim 1, wherein the high-coercivity magnets have parallel magnetization.

5. The permanent magnet rotor assembly of claim 1, wherein the high-coercivity magnets are segmented.

6. The permanent magnet rotor assembly of claim 1, wherein the at least one low-coercivity magnet is curved and has radial magnetization.

7. The permanent magnet rotor assembly of claim 1, wherein at least one of the high-coercivity magnets is substantially parallel to a radius of the pole.

8. The permanent magnet rotor assembly of claim 1, wherein an inner layer of the at least one low-coercivity magnet has a V configuration.

9. The permanent magnet rotor assembly of claim 1, wherein two low-coercivity magnets are separated by a center post.

10. The permanent magnet rotor assembly of claim 1, wherein the high-coercivity magnets are a different size than the low-coercivity magnets, and wherein each pole includes only two to three magnet sizes.

11. The permanent magnet rotor assembly of claim 1, wherein the first arrangement of permanent magnets includes two low-coercivity magnets, and wherein the second arrangement of permanent magnets includes one low-coercivity magnet.

12. An electrified vehicle, comprising:

an electric drive system having an electric motor including a stator; and a permanent magnet rotor assembly for the electric motor configured to rotate due to a rotating magnetic field created by the stator, wherein the permanent magnet rotor assembly includes an annular stack of rotor lamination layers ("rotor lams") constructed of a magnetic core material, the rotor lams having inner axial surfaces collectively defining a group of first openings through the magnetic core material and a group of second openings through the magnetic core material, wherein the annular stack includes at least one pole;

a first arrangement of permanent magnets, wherein each respective permanent magnet of the first arrangement is disposed within a corresponding one of the group of first openings, and wherein the first arrangement of permanent magnets is arranged in a mixed magnet configuration having at least one low-coercivity magnet surrounded by at least two high-coercivity magnets; and a second arrangement of permanent magnets, wherein each respective permanent magnet of the second arrangement is disposed within a corresponding one of the group of second openings, wherein the second arrangement of permanent magnets is arranged in a mixed magnet configuration having at least one low-coercivity magnet surrounded by at least two high-coercivity magnets.

13. The electrified vehicle in claim 12, wherein the at least one high-coercivity magnet includes at least one of a neodymium-based magnet or a samarium cobalt magnet.

14. The electrified vehicle in claim 12, wherein the at least one low-coercivity magnet includes a ferrite-base magnet.

15. The electrified vehicle in claim 12, wherein the high-coercivity magnets are segmented.

16. The electrified vehicle in claim 12, wherein the low-coercivity magnets and the high-coercivity magnets are curved and have radial magnetization.

17. The electrified vehicle in claim 12, wherein at least one of the high-coercivity magnets is substantially parallel to a radius of the pole.

18. The electrified vehicle in claim 12, wherein an inner layer of the low-coercivity magnets has a V configuration.

19. A method for manufacturing a permanent magnet rotor assembly, comprising:

laminating a plurality of sheets of a magnetic core material to form an annular stack of rotor lams, wherein the sheets have inner axial surfaces collectively defining a group of first openings through the sheets of magnetic core material and a group of second openings through the magnetic core material;

positioning a first arrangement of permanent magnets within a corresponding one of the group of first openings, and wherein the first arrangement of permanent magnets is arranged in a mixed magnet configuration having at least one low-coercivity magnet surrounded by at least two high-coercivity magnets; and positioning a second arrangement of permanent magnets within a corresponding one of the group of second openings, wherein the second arrangement of permanent magnets is arranged in a mixed magnet configuration having at least one low-coercivity magnet surrounded by at least two high-coercivity magnets.

20. The method in claim 19, further comprising:

positioning a third arrangement of permanent magnets within a corresponding one of a group of third openings, wherein the third arrangement of permanent magnets is arranged in a mixed magnet configuration having at least one low-coercivity magnet surrounded by at least two high-coercivity magnets.

* * * * *